United States Patent [19]

Fritz

[11] 4,188,269

[45] Feb. 12, 1980

[54] METHOD OF MAKING ELECTRODES FOR ELECTROLYTIC PURPOSES

[75] Inventor: Heinz P. Fritz, Munich, Fed. Rep. of Germany

[73] Assignee: Rheinisch-Westfälisches Elektrizitätswerk AG, Essen, Fed. Rep. of Germany

[21] Appl. No.: 908,583

[22] Filed: May 22, 1978

[30] Foreign Application Priority Data

May 20, 1977 [DE] Fed. Rep. of Germany ....... 2722840

[51] Int. Cl.² ............................ C25D 5/42; C25D 9/06
[52] U.S. Cl. ..................................... 204/32 R; 204/57
[58] Field of Search ................................ 204/57, 32 R

[56] References Cited

U.S. PATENT DOCUMENTS 3,935,082  1/1976  Fritz et al. ...................... 204/32 R
4,019,970  4/1977  Fritz et al. ...................... 204/32 R

OTHER PUBLICATIONS

"Adhesion of Electroplated Coatings to Ti" by Connie L. Stanley & A. Brenner, 43rd Tech. Proceed., Amer. Electroplaters Soc., vol. 43, 1956, p. 123.

Primary Examiner—R. L. Andrews
Attorney, Agent, or Firm—Karl F. Ross

[57] ABSTRACT

An electrode for use in electrolytic processes, e.g. as an energy storage electrode for a lead-dioxide accumulator or storage battery, is produced by subjecting a titanium support to a cleaning operation and subsequently to a surface treatment in a medium which is constituted by a titanium (IV) salt solution. This results in the formation of a titanium (IV) adsorbed layer onto which the lead dioxide active material is anodically deposited. An important characteristic of the invention is that the surface treatment is carried out such that hydrolysis of the titanium (IV) activated surface does not occur and hence the titanium at the surface of the support and the interface between the latter and the lead dioxide active material is in the tetravalent titanium state. The titanium deposit is from a titanium (IV) salt of an inorganic oxy acid, preferably perchloric acid, a salt of an organic acid, or a complex of the titanium (IV) ions with a complex former.

5 Claims, No Drawings

METHOD OF MAKING ELECTRODES FOR ELECTROLYTIC PURPOSES

FIELD OF THE INVENTION

The present invention relates to a method of making an electrode for an electrochemical process and, more particularly, to a method of making an electrode suitable for use in a lead-dioxide storage battery or the like and having a titanium support.

BACKGROUND OF THE INVENTION

In U.S. Pat. No. 4,019,970, issued 26 Apr. 1977 to the present inventor among others and commonly assigned with the present application, there is described the fabrication of an electrode containing lead-dioxide active material for use in a lead-acid accumulator or storage battery. In that system a supporting body of titanium was pickled in a boiling solution of oxalic acid and then adsorptively coated with a titanium (IV) layer in a treatment bath. This treatment was followed by the anodic coating of the titanium body with $PbO_2$ in an electrolyte having a given composition.

That system was, in turn, an improvement on the technique described in commonly owned U.S. Pat. No. 3,935,082 which described a process for manufacturing electrodes in which a titanium body was cleaned by pickling and was treated by immersion in a titanium-oxalato complex solution.

The present invention is related to both of these patents in that it also deals with a process for producing electrodes suitable for a variety of electrolytic purposes, especially for lead accumulators or storage batteries and for electrochemical synthesis, the electrodes consisting essentially of a titanium support as described in the aforementioned patents and a deposit or layer of lead-dioxide active material upon this support.

When a titanium support of the type described in these patents is subjected to a cleaning operation or pickling and a surface treatment in the presence of titanium (IV) ions, i.e. tetravalent titanium ions, and the lead dioxide is then applied, problems are encountered as will be discussed below.

Firstly, when an electrode is made from a titanium support and lead dioxide deposit, it is desirable that the electrode have a high cycling life and excellent adhesion of the deposit of lead dioxide to the support, the interface having a minimum resistance.

A strong adhesion of the active material to the support is essential to a high cycling life in the effective use of the electrode, especially in lead-acid or similar storage batteries or accumulators.

In the system of the earlier patents, the lead dioxide deposit is anodically precipitated on the titanium (IV) adsorptive layer. The titanium salt solution could be added to the pickling bath or to a separate surface treatment bath or could be formed in the latter bath.

Experiments have shown that, while the system of the aforementioned patents represents a major advance in the art, nonetheless problems are encountered with the cycling life of the electrodes.

OBJECTS OF THE INVENTION

It is the principal object of the present invention to improve upon the methods described in the aforementioned patents so as to eliminate even the minor problems which have been discovered in continued operation with the systems there described.

It is another object of the invention to provide an improved method of making a highly adherent and coherent electrode, in which a lead-dioxide active mass is carried by a titanium support, which will sharply increase the cycling life of the electrode.

Still another object of the invention is to improve upon the quality of the electrode made when a titanium support is treated with titanium (IV) ions and a lead dioxide deposit is then formed thereon.

It is a further object of the invention to provide an improved electrode, especially for use in lead-acid storage batteries or accumulators and for electrochemical synthesis.

SUMMARY OF THE INVENTION

These objects and others which will become apparent hereinafter are attained, in accordance with the present invention, in a method in which the titanium support is treated in a titanium salt solution and, between this treatment and the application of the lead-dioxide active material, the hydrolysis of the titanium (IV) adsorbate layer on the titanium body is prevented. It is also essential for the present invention that the titanium (IV) ions are present in the treating solution in the form of salts of one or more of the following:

inorganic oxyacids,
organic acids, and
complex formers. In other words, the titanium (IV) salt solution contains salts of inorganic oxyacids, organic salts or complexes of the titanium (IV) ions alone or in any combination.

When one makes use of solutions of salts of inorganic oxyacids, it is preferred to employ the titanium (IV) - perchlorate. When organic salt solutions are employed, preference is given to titanium (IV) acetate. When a complex of the titanium (IV) ions is to be present in the solution, alone or in combination with one of the aforementioned salts, it is preferred that the complex former by cyclohexanediamine - (1,2)-tetraacetic acid.

The invention is based upon my discovery that one of the difficulties with the earlier systems, e.g. those of the aforementioned patents, appears to arise because a hydrolysis sets in of the titanium (IV) coating on the titanium support between the surface treatment which forms this titanium (IV) coating and the application of the lead-dioxide active material.

This hydrolysis of the tetravalent titanium coating appears to take place in accordance with the following equations:

$$Ti^{4+} + 4H_2O \rightarrow Ti(OH)_4 + 4H^+ \text{ and}$$

$$Ti(OH)_4 \rightarrow TiO_2 + 2H_2O.$$

The result is the formation of an oxide layer at the interface between the titanium support and the lead-dioxide active material. This oxide layer appears, moreover, to be a poor conductor and is a barrier to good adhesion of the active material. Thus, on the one hand, it mechanically reduces the strength of any bond between the lead-dioxide active material and, on the other hand, it provides a degree of an electrical barrier at the interface. Both the useful life and the electrical performance of the electrode thus are not as satisfactory as they might be.

The hydrolysis can be avoided by maintaining the electrode in contact with a relatively acidic solution until the commencement of lead dioxide deposition, thereby driving the first reaction scheme in the opposite direction or, at least, imposing a mass-action barrier to hydrolysis. It is also possible when the complex former is cyclohexanediamine-(1,2)-tetraacetic acid or the salt former is the acetate ion, to accomplish a similar result with rinsing of the titanium support.

In the following discussion, the lead dioxide deposit can be applied as described in the aforementioned patents and the titanium support can be constructed as there described as well.

SPECIFIC EXAMPLES

EXAMPLE I

After the usual pickling (cleaning) as described in U.S. Pat. No. 4,019,970 for 30 minutes in 15% aqueous oxalic acid at 100° C. and washing, the titanium support (i.e. an expanded metal sheet) is rinsed and is immersed in a solution consisting of 0.2 molar $Ti(ClO_4)_4$ and 15% $HClO_4$, balance water. The solution is held for two hours at its boiling point to form the adsorption layer upon the titanium support. Without rinsing the electrode is then anodically coated with lead dioxide in the manner described in U.S. Pat. No. 4,019,970.

EXAMPLE II

After pickling as in Example I, the titanium workpiece is immersed in a solution of 0.05 molar $Ti(CH_3COO)_4$ and 15% acetic acid, balance water. The solution is boiled in contact with the titanium support for two hours to effect the formation of the adsorption layer. After rinsing, the electrode was coated with lead dioxide in the manner described.

EXAMPLE III

After pickling as in Example I, the titanium support is boiled in an aqueous solution of 0.02 molar cyclohexanediamine-(1,2)-tetraacetic acid salt of tetravalent titanium. After two hours the adsorption layer was formed and the electrode was rinsed and coated with the lead-dioxide active material.

All three electrodes thus produced were found to have a higher cycling life than the electrodes of U.S. Pat. No. 4,019,970 but were found to differ in various electrical parameters. For example, the product of Example I had by far the lowest deposition voltage for the lead dioxide coating while the product of Example III had the highest. This means that the various different surface treatments to form the tetravalent titanium adsorptive layer also have a significant effect upon the subsequent deposition of the active material. This has the advantage of eliminating the need, in some cases, for high deposition potentials as are usually required when the electrodes have complex configurations.

I claim:

1. A process for making an electrode containing lead dioxide as an active material, comprising the steps of:
    (a) pickling a titanium support body;
    (b) adsorptively coating the pickled titanium support body with a titanium (IV) layer by treating said body in a solution of a titanium (IV) compound selected from the group which consists of salts of inorganic oxyacids, organic salts and salts with complex formers or mixtures thereof;
    (c) controlling the formation of the titanium (IV) layer on the surface of said body to preclude hydrolysis thereof by one of the steps of:
        ($C_1$) maintaining the surface of said body in contact with a titanium (IV) perchlorate acid bath and then carrying out step (d) without rinsing of the surface,
        ($C_2$) maintaining the surface of said body in contact with a titanium (IV) acetate acid bath and then carrying out step (d) after rinsing of the surface, and
        ($C_3$) maintaining the surface of said body in contact with a bath of a titanium (IV) salt of cyclohexanediamine-(1,2)-tetracetic acid and then carrying out step (d) after rinsing the surface; and
    (d) anodically coating the latter surface with lead dioxide.

2. A process for making an electrode containing lead dioxide as an active material, comprising the steps of:
    (a) pickling a titanium support body;
    (b) adsorptively coating the pickled titanium support body with a titanium (IV) layer by treating said body in a titanium (IV) perchlorate acid bath, thereby controlling the formation of the titanium (IV) layer dioxide and transformation said body to titanium on the surface of said body to preclude hydrolysis and
    (c) anodically coating the latter surface, without prior rinsing, with lead dioxide.

3. A process for making an electrode containing lead dioxide as an active material, comprising the steps of:
    (a) pickling a titanium support body;
    (b) adsorptively coating the pickled titanium support body with a titanium (IV) layer by treating said body in a titanium (IV) acetate acid bath and rinsing the surface with water thereby controlling the formation of the titanium (IV) layer on the surface of said body to preclude hydrolysis and transformation to titanium dioxide and
    (c) anodically coating the latter surface with lead dioxide.

4. A process for making an electrode containing lead dioxide as an active material, comprising the steps of:
    (a) pickling a titanium support body;
    (b) adsorptively coating the pickled titanium support body with a titanium (IV) layer by treating said body in a titanium (IV) salt of cyclohexanediamine-(1,2)-tetraacetic acid and rinsing the surface thereby controlling the formation of the titanium (IV) layer on the surface of said body to preclude hydrolysis and transformation to titanium dioxide; and
    (c) anodically coating the latter surface with lead dioxide.

5. An electrode, for a lead accumulator or storage battery, made by the process of claim 1.

* * * * *

UNITED STATES PATENT AND TRADEMARK OFFICE
Certificate

Patent No. 4,188,269                      Patented February 12, 1980

Heinz Peter Fritz

Application having been made by Heinz Peter Fritz, the inventor named in the patent above identified, and Rheinisch-Westfalisches Elektrizitatswerk AG., Essen, Germany, a corporation of Germany, the asignee, for the issuance of a certificate under the provisions of Title 35, Section 256, of the United States Code, adding the names of Dietrich Wabner and Rainer Huss as joint inventors, and a showing and proof of facts satisfying the requirements of the said section having been submitted, it is this 7th day of July 1981, certified that the names of the said Dietrich Wabner and Rainer Huss are hereby added to the said patent as a joint inventor with the said Heinz Peter Fritz.

Fred W. Sherling
*Associate Solicitor.*